Jan. 31, 1928.

C. S. LEHMAN 1,657,833

COMBINED DEMOUNTABLE WHEEL AND RIM

Filed March 5, 1927    2 Sheets-Sheet 1

Inventor
C. S. Lehman.

Attorney.

Jan. 31, 1928.
C. S. LEHMAN
1,657,833
COMBINED DEMOUNTABLE WHEEL AND RIM
Filed March 5, 1927    2 Sheets-Sheet 2
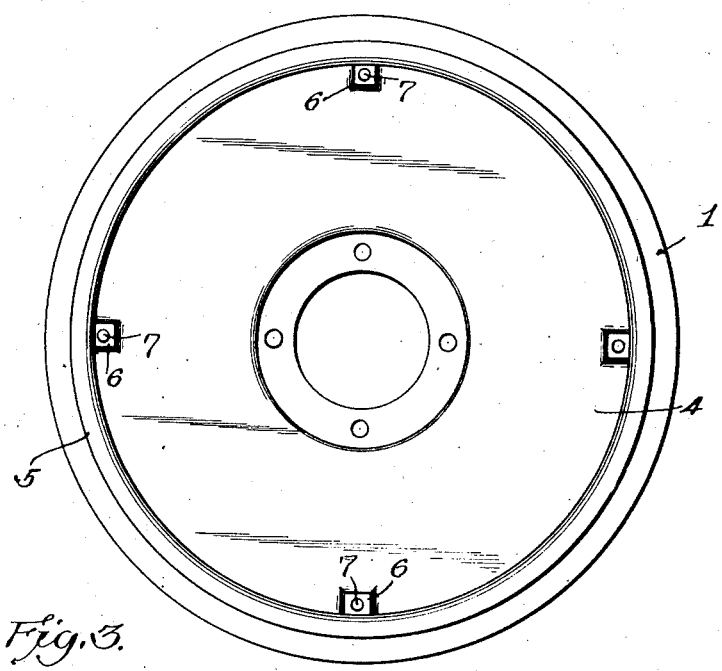
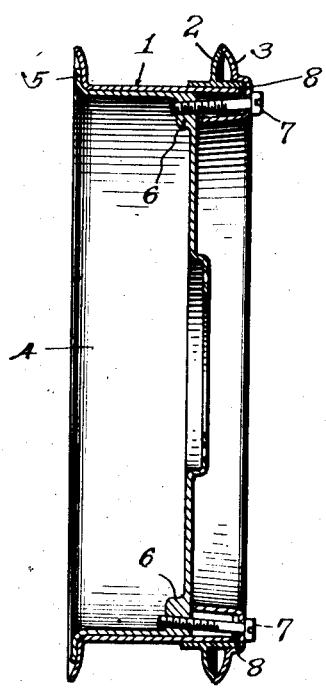
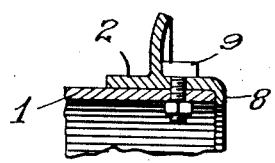
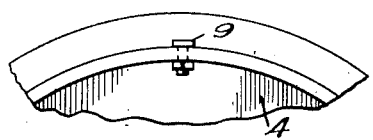
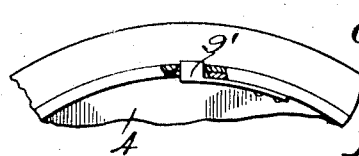
Inventor
C. S. Lehman.
Attorney.

Patented Jan. 31, 1928.

1,657,833

UNITED STATES PATENT OFFICE.

CHRISTIAN S. LEHMAN, OF LAWN, PENNSYLVANIA.

COMBINED DEMOUNTABLE WHEEL AND RIM.

Application filed March 5, 1927. Serial No. 173,190.

This invention relates to demountable wheels and rims for use on automobiles and the like, and has for its principal object the provision of a unitary construction of the characters referred to in which the tire may be quickly and easily changed at the option of the user by removal of the tire-carrying rim from the wheel, or by removal of the tire from the rim without dismounting the rim from the wheel. A further object of the invention is the provision of a simple mechanical organization for accomplishing the foregoing desiderata and which lends itself readily to quantity production and may be manufactured at low cost by existing apparatus. Still further objects of the invention are the provision of a combined demountable wheel and rim construction of a high practical design, consisting of a minimum number of parts, while possessing the rigidity and safety demanded, which is of neat appearance, and may be securely mounted, and demounted with a minimum of time and effort and without the use of special tools.

Other and further objects and advantages of the invention will be developed or become apparent as the following detailed description progresses.

The general construction of the preferred form of my invention consists of a demountable wheel of the disc or artillery type modified from the usual construction by having its rim provided with a flange or bead on its inner edge only, which bead serves as a stop for the rim. A securing ring is provided for detachable connection to the wheel and has a flange cooperating with the rim to clamp it against the flange of the wheel. The rim is provided with a permanent peripheral flange or bead on one edge only, and the tire is retained thereon by means of a ring, or split ring, which may be merely slid onto the rim from the edge opposite the flange thereof. Suitable fastening means are provided for detachably locking the tire retaining ring to the rim with facility and despatch. In the complete assemblage, the rim securing ring being outermost, performs the dual function of not only clamping the rim on the wheel, but serves the important purpose of additionally locking the tire retaining ring in place. This permits the use of fewer fastenings for the tire retaining ring, and only of such character as to hold the tire until mounted upon the wheel.

For a more detailed explanation of my invention reference will now be made to the accompanying drawings illustrating the preferred embodiments of my invention and in which similar reference characters refer to corresponding parts in all the several views. In the drawings—

Fig. 2 is a similar view showing the reverse side thereof;

Fig. 3 is a diametrical sectional view thereof;

Fig. 4 is an edge view, while

Fig. 7 shows in detail the manner of securing the tire retaining ring on the rim; and Fig. 8 and Fig. 9 show details of a modified construction for securing the tire retaining ring in place.

Figure 1:
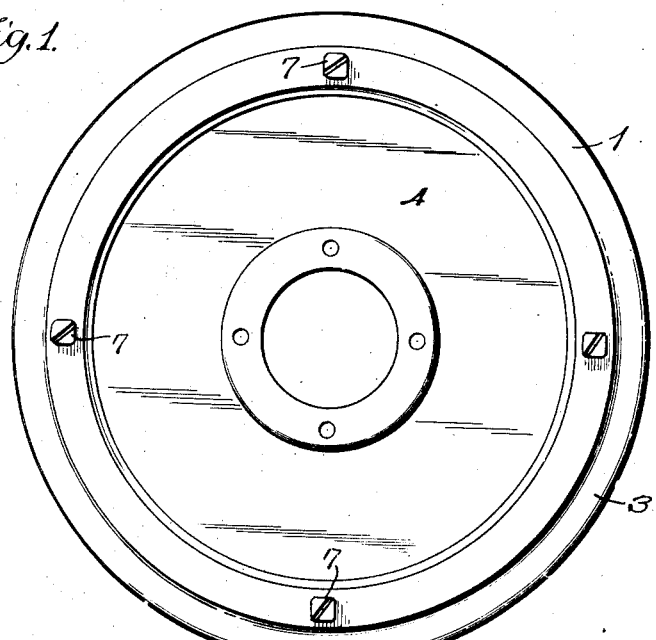
Fig. 1 is an elevational view of my improved demountable wheel and rim showing the side thereof normally exposed.
Figure 4:
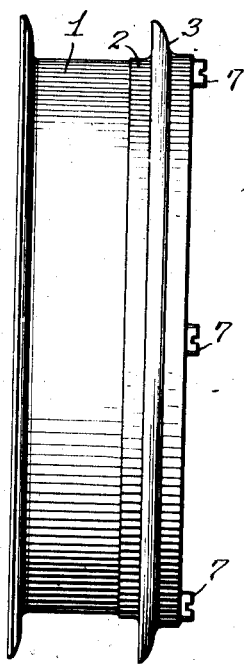
Figure 5:
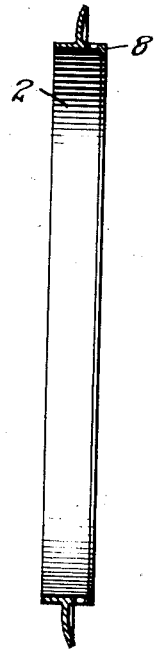
Fig. 5 and Fig. 6 show diametrical sectional views of the tire retaining ring and the outer rim securing ring, respectively.

In the drawings I have designated the rim generally by reference numeral 1, while the removable ring thereof is shown at 2, the wheel at 4, and the ring for clamping the rim onto the wheel at 3. The rim will preferably be pressed from sheet metal into annular form, and on one edge thereof is provided a flange or integral bead, of the usual contour, for engaging one side of the bead of the tire carried thereby. The edge of the rim opposite the peripheral bead is plain and adapted to removably receive the tire retaining ring 2, which ring may be continuous or split, as desired, and either spun from sheet metal or formed from a solid rod. The retaining ring 2 on its inner face is shaped opposite to that of the bead or flange of the rim 1, and when the ring 2 is applied the rim unit of the assemblage is complete.

To apply a tire to the rim, which may be done either on or off the wheel, the ring 2 is provisionally detached as hereinafter described, and the tire merely slid onto the rim axially, from the side having the plain edge. The retaining ring 2 is next applied, in a similar manner, by sliding the same onto the rim, behind the tire bead.

As shown in Fig. 7, the tire retaining ring 2 may have a peripheral flange 8 adapted to engage the plain edge of the rim 1 for insuring an exact space for the reception of the tire. As a simple means for locking the ring 2 to the rim 1, I provide a plurality of bolts 9, which may be inserted through registering openings provided in the rim 1 and ring 2. In practice it is preferable that one of these openings be of elongated form to permit registration of the openings despite slight relative rotary movement of the parts in applying the ring 2. Usually two such bolts 9, diametrically disposed, are sufficient, since cover ring 3, when applied, supplements the function of bolts 9, as hereinafter referred to.

If desired, other means may be substituted for the bolt 9, and in Figs. 8 and 9 I have illustrated a spring pressed projection 9 bradded to the inner face of the rim and adapted to snap into the openings formed in the ring 2 and rim 1 when brought into registration. To remove the ring 2 it is merely necessary to depress projection 9 and slide the ring 2 axially from the rim 1.

Figure 6:
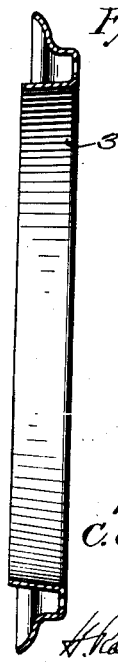

While the above described rim may possibly be modified for use on wheels other than that shown by me, because of the special design of the rim I have devised a wheel especially adapted to the rim, and constructed to additionally lock the ring 2 on the rim. This wheel 4 is formed of a metal disc having an annular rim thereon conforming to the shape of the inner surface of rim 1, but of slightly less width to accommodate locking means 9. The center of the disc is provided with the usual demounting means. Suitably spaced about the periphery of the wheel I have shown threaded openings, preferably found in bosses 6, adapted to receive the threaded ends of bolts 7 for drawing the cover or rim clamping ring 3 against the rim. As shown in Fig. 6 the ring 3 is channeled and provided with an inner flange adapted to abut the disc portion of the wheel, and an outer flange oppositely curved to match the bead of ring 2 and adapted to match the same as shown in Fig. 3 to conceal the plain edge of rim 1, and present the appearance as viewed in Fig. 1. The cover ring 3 is provided with openings corresponding to the openings in bosses 6 through which headed bolts 7 extend and are concealed. Particular attention is called to the fact that while the cover ring is of artistic effect, it is primarily designed to clamp the rim to the wheel. Since the cover ring engages ring 2, it reinforces the same and enables me to employ fewer bolts 9.

Thus I have devised a combined demountable wheel and rim construction in which the entire wheel may be readily removed, or the rim may be removed from the wheel, and in which the tire may be easily and quickly removed from the rim.

While I have illustrated and described with particularity the preferred form of my invention, I do not desire to be limited to the exact structural details thus illustrated and described, but intend to cover all forms and arrangements which come within the terms employed in the definitions of my invention, constituting the following claims:

1. A demountable rim having one flange thereof removable and means for holding said flange in place on the rim, said means and said flange including two outstanding flanges inclined toward each other from the body of the rim outwardly and meeting at the outer periphery of the rim flange.

2. In a wheel and rim assembly, a rim having one flange thereof detachable, a single means for holding the rim on the wheel and for holding the rim flange in place on the rim, said means including a member having a portion supporting the outer periphery of the rim flange and another portion supporting the base of the rim flange.

3. A demountable rim comprising a cylindrical body of uniform diameter having a peripheral flange at one edge, a retaining ring comprising a substantially flat band slidable over the other edge onto said body and provided with a central upstanding tire-engaging flange, and means extending through said annular body and engaging said retaining ring on the outer side of the said flange for locking it on the body.

In testimony whereof I affix my signature.

CHRISTIAN S. LEHMAN.